US011935685B2

(12) United States Patent
Yoshioka et al.

(10) Patent No.: US 11,935,685 B2
(45) Date of Patent: Mar. 19, 2024

(54) INDUCTOR COMPONENT AND MANUFACTURING METHOD OF INDUCTOR COMPONENT

(71) Applicant: Murata Manufacturing Co., Ltd., Kyoto-fu (JP)

(72) Inventors: Yoshimasa Yoshioka, Nagaokakyo (JP); Kouji Yamauchi, Nagaokakyo (JP); Riku Kanemoto, Nagaokakyo (JP); Katsufumi Sasaki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 598 days.

(21) Appl. No.: 17/037,527

(22) Filed: Sep. 29, 2020

(65) Prior Publication Data

US 2021/0104354 A1 Apr. 8, 2021

(30) Foreign Application Priority Data

Oct. 3, 2019 (JP) ................................. 2019-182905

(51) Int. Cl.

| | |
|---|---|
| ***H01F 27/28*** | (2006.01) |
| ***H01F 17/00*** | (2006.01) |
| ***H01F 27/29*** | (2006.01) |
| ***H01F 27/32*** | (2006.01) |
| ***H01F 41/04*** | (2006.01) |

(52) U.S. Cl.

CPC ..... *H01F 27/2823* (2013.01); *H01F 17/0013* (2013.01); *H01F 27/29* (2013.01); *H01F 27/324* (2013.01); *H01F 41/041* (2013.01); *H01F 2017/0066* (2013.01)

(58) Field of Classification Search

CPC .. H01F 27/2823; H01F 17/0013; H01F 27/29; H01F 27/324; H01F 41/041; H01F 2017/0066; H01F 41/042; H01F 41/046; H01F 17/0006; H01F 27/2804; H01F 2027/2809

See application file for complete search history.

(56) References Cited

U.S. PATENT DOCUMENTS

2018/0075965 A1* 3/2018 Yoshioka ............ H01F 27/2823
2019/0074125 A1* 3/2019 Yoshioka ................ H01F 27/29
2019/0115150 A1* 4/2019 Yoshioka ................ H01F 17/04

(Continued)

FOREIGN PATENT DOCUMENTS

| | | |
|---|---|---|
| CN | 109427461 A | 3/2019 |
| CN | 110136921 A | 8/2019 |
| JP | 6024243 B2 | 11/2016 |

(Continued)

*Primary Examiner* — Bickey Dhakal
*Assistant Examiner* — Matthew T Sarles
(74) *Attorney, Agent, or Firm* — Studebaker & Brackett PC

(57) ABSTRACT

In an inductor component, a first magnetic layer thickness of the first magnetic layer as a measurement in the normal direction is smaller than a second magnetic layer thickness of the second magnetic layer as a measurement in the normal direction. An inductor wiring thickness of the inductor wiring as a measurement in the normal direction is from larger than 0.5 times a vertical wiring thickness of the vertical wiring as a measurement in the normal direction to smaller than 1.5 times the vertical wiring thickness.

17 Claims, 8 Drawing Sheets

(56) References Cited

U.S. PATENT DOCUMENTS

2019/0244743 A1* 8/2019 Hirai .................. H01F 27/2804
2020/0373049 A1* 11/2020 Fujito ...................... H01F 5/06

FOREIGN PATENT DOCUMENTS

JP 2018-170321 A 11/2018
JP 2019-046993 A 3/2019
JP 2019-134141 A 8/2019

* cited by examiner

INDUCTOR COMPONENT AND MANUFACTURING METHOD OF INDUCTOR COMPONENT

CROSS-REFERENCE TO RELATED APPLICATION

This application claims benefit of priority to Japanese Patent Application No. 2019-182905, filed Oct. 3, 2019, the entire content of which is incorporated herein by reference.

BACKGROUND

Technical Field

The present disclosure relates to an inductor component and a manufacturing method of the inductor component.

Background Art

In the inductor component described in Japanese Patent No. 6024243, first inductor wiring is arranged on a first surface of a non-magnetic printed board and a first magnetic layer is arranged on the first inductor wiring and on the opposite side of the printed board. Further, second inductor wiring is arranged on a second surface of the printed board, which is opposite the first surface, and a second magnetic layer is arranged on the second inductor wiring and on the opposite side of the printed board. That is, the inductor component described in Japanese Patent No. 6024243 has a structure in which the layer of the first inductor wiring and the layer of the second inductor wiring are sandwiched by the magnetic layers from both sides.

SUMMARY

For the purpose of reducing the thickness and the like, such an inductor component as that described in Japanese Patent No. 6024243 can have a structure in which the second inductor wiring on the side of the second surface of the printed board is omitted and the first inductor wiring on the side of the first surface is employed as a single layer. Japanese Patent No. 6024243 presents no reviewing about, if such a structure is used, what design of the thicknesses of the first magnetic layer and the second magnetic layer enables efficient manufacture of the inductor component.

According to one embodiment of the present disclosure, an inductor component includes inductor wiring of a single layer; a first magnetic layer arranged at a side of a first surface of the inductor wiring; a second magnetic layer arranged at a side of a second surface of the inductor wiring, the second surface being opposite the first surface; and vertical wiring that penetrates the first magnetic layer and is coupled to the inductor wiring. When a direction orthogonal to a principal surface of the second magnetic layer is referred to as a normal direction, a first magnetic layer thickness of the first magnetic layer as a measurement in the normal direction is smaller than a second magnetic layer thickness of the second magnetic layer as a measurement in the normal direction, and an inductor wiring thickness of the inductor wiring as a measurement in the normal direction is larger than 0.5 times a vertical wiring thickness of the vertical wiring as a measurement in the normal direction and smaller than 1.5 times the vertical wiring thickness (i.e., from larger than 0.5 times a vertical wiring thickness of the vertical wiring as a measurement in the normal direction to smaller than 1.5 times the vertical wiring thickness).

According to another embodiment of the present disclosure, a manufacturing method of an inductor component includes a first covering step to form a first covering portion that covers part of a first surface of insulation resin; an inductor wiring processing step to form inductor wiring by plating in a portion that is included in the first surface of the insulation resin and is not covered with the first covering portion; a second covering step to form a second covering portion that partly covers part of a first surface of the first covering portion on an opposite side of the insulation resin and a first surface of the inductor wiring on an opposite side of the insulation resin; and a vertical wiring processing step to form vertical wiring by plating in a portion that is included in the first surface of the insulation resin and is not covered with the second covering portion. The manufacturing method further includes a covering portion removal step to remove the first covering portion and the second covering portion after the vertical wiring processing step; a first magnetic layer processing step to laminate a first magnetic layer on a side of the first surface of the inductor wiring after the covering portion removal step; and a second magnetic layer processing step to laminate a second magnetic layer on a side of a second surface of the inductor wiring. When a direction orthogonal to a principal surface of the second magnetic layer is referred to as a normal direction, in the vertical wiring processing step, the vertical wiring is formed so that a vertical wiring thickness of the vertical wiring as a measurement in the normal direction is larger than two-thirds times an inductor wiring thickness of the inductor wiring as a measurement in the normal direction and smaller than twice the inductor wiring thickness (i.e., from larger than two-thirds times an inductor wiring thickness of the inductor wiring as a measurement in the normal direction to smaller than twice the inductor wiring thickness).

In the above-described configuration, a difference between the inductor wiring thickness and the vertical wiring thickness is small and thus, the inductor wiring and the vertical wiring can be formed with similar manufacturing apparatuses on similar machining conditions. Accordingly, extensive change in manufacturing apparatus or machining conditions is unnecessary between the formation of the inductor wiring and the formation of the vertical wiring such that the efficiency in manufacturing the inductor component can be raised.

As a result, the efficiency in manufacturing the inductor component can be raised.

Other features, elements, characteristics and advantages of the present disclosure will become more apparent from the following detailed description of some embodiments of the present disclosure with reference to the attached drawings.

DETAILED DESCRIPTION

Embodiments of Inductor Component

Embodiments of an inductor component are described below. To facilitate understanding, the drawings may be illustrated by enlarging elements. The dimensional ratios of the elements may be different from those in actuality or in another drawing. To facilitate understanding, hatch patterns for part of the elements may be omitted in the cross-sectional views illustrated with hatch patterns.

First Embodiment

A first embodiment of an inductor component is described below.

Figure 1:
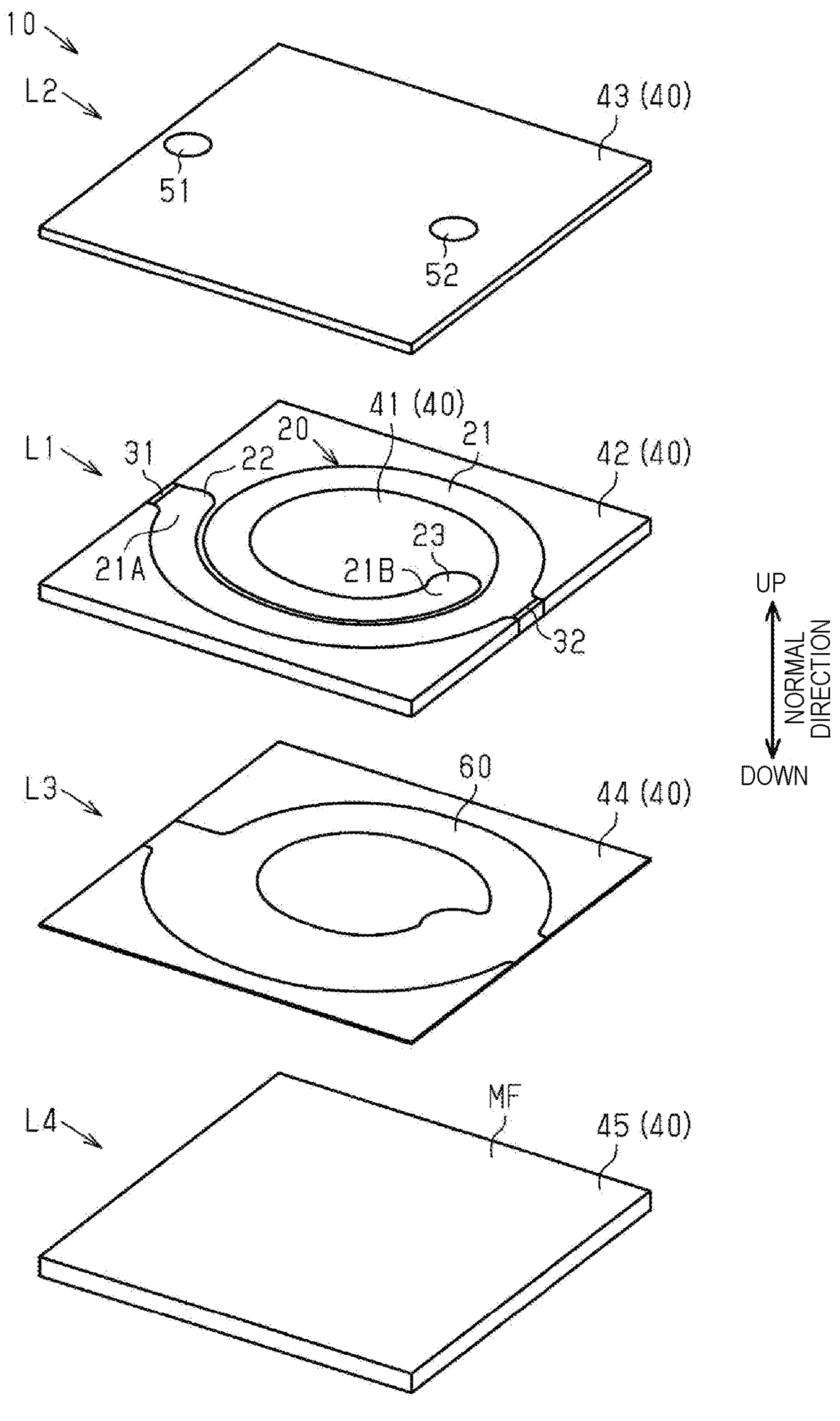
FIG. 1 is an exploded perspective view of an inductor component according to a first embodiment.

As illustrated in FIG. 1, an inductor component 10 as a whole has a structure in which four layers approximately like thin plates are laminated in the thickness direction. In the description below, the direction in which the four layers are laminated is referred to as the up-and-down direction.

A first layer L1 is made up of inductor wiring 20, first dummy wiring 31, second dummy wiring 32, an inner magnetic path portion 41, and an outer magnetic path portion 42. In a plan view, the first layer L1 is approximately shaped like a square.

Figure 2:
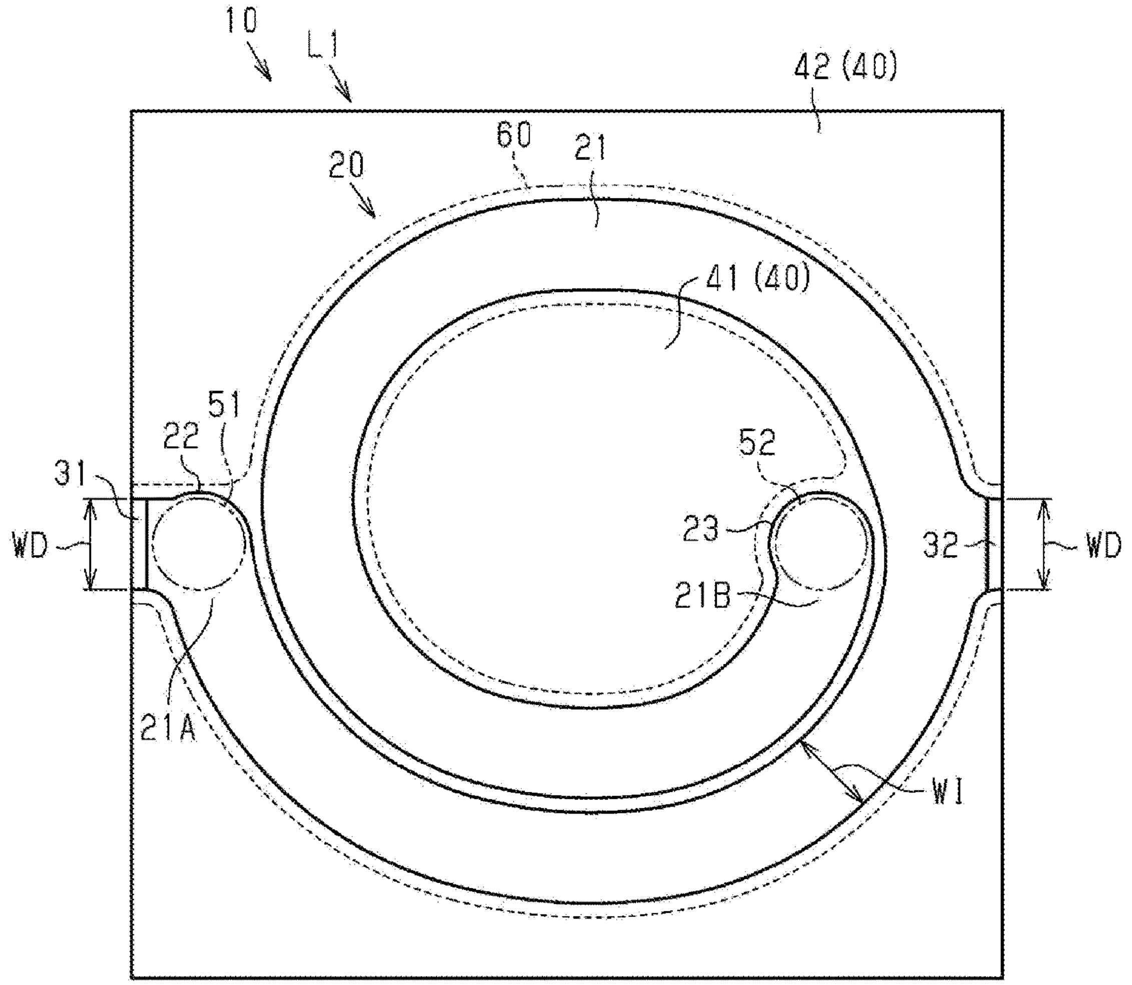
FIG. 2 is a transparent top view of the inductor component according to the first embodiment.

As illustrated in FIG. 2, in the first layer L1, the inductor wiring 20 is made up of a wiring body 21, a first pad 22, and a second pad 23. The inductor wiring 20 extends like an approximate swirl whose center is in a central portion of a principal surface of the first layer L1 approximately shaped like a square in a top view. Specifically, in a top view, the wiring body 21 of the inductor wiring 20 is wound counterclockwise like an approximate swirl from an outer track end portion 21A, which is an outer side portion in a radial direction, to an inner track end portion 21B, which is an inner side portion in the radial direction. In FIG. 2, first vertical wiring 51 and second vertical wiring 52, which are described later, are indicated with chain double-dashed lines and insulation resin 60 is indicated with broken lines.

Regarding the number of turns of the inductor wiring 20, approximately 1.0 turn is defined for a case where an approximately 360-degree shift is performed on the basis of one edge of the inductor wiring 20 when the shift is caused from the one edge of the inductor wiring 20 to the other edge of the inductor wiring 20 in the direction in which the inductor wiring 20 extends. That is, the angle by which the inductor wiring 20 is wound is indicated by the number of turns of the inductor wiring 20. Thus, for example, when the inductor wiring 20 is wound by approximately 180 degrees, the number of turns is approximately 0.5. In the present embodiment, the angle by which the inductor wiring 20 is wound is approximately 540 degrees. Accordingly, in the present embodiment, the number of turns by which the inductor wiring 20 is wound is approximately 1.5.

The inductor wiring 20 is made from a conductive material and in the composition of the inductor wiring 20 in the present embodiment, the proportion of copper is approximately 99 wt % or more and the proportion of sulfur is approximately 0.1 wt % or more and less than approximately 1.0 wt % (i.e., from approximately 0.1 wt % to less than approximately 1.0 wt %).

As illustrated in FIG. 1, the first pad 22 is coupled to the outer track end portion 21A of the wiring body 21. In a plan view, the first pad 22 is approximately circular. The material of the first pad 22 is the same as the material of the wiring body 21.

The first dummy wiring 31 extends from the first pad 22 to an outer edge of the first layer L1. The first dummy wiring 31 extends to a side surface of the first layer L1 and is exposed on an outer surface of the inductor component 10.

The second pad 23 is coupled to the inner track end portion 21B of the wiring body 21. In a plan view, the second pad 23 is approximately circular. The material of the second pad 23 is the same as the material of the wiring body 21.

In a portion between the outer track end portion 21A and the inner track end portion 21B of the wiring body 21, the second dummy wiring 32 extends from a position, which is where the wiring body 21 is wound by approximately 0.5 turns from the outer track end portion 21A. The second dummy wiring 32 extends to a side surface of the first layer L1 and is exposed on the outer surface of the inductor component 10.

In the first layer L1, a region further inside than the inductor wiring 20 constitutes the inner magnetic path portion 41. The inner magnetic path portion 41 is formed by a mixture of resin and magnetic powder, such as ferrite or a metal magnetic substance. That is, the inner magnetic path portion 41 is made from a magnetic material. In the first layer L1, a region further outside than the inductor wiring 20 constitutes the outer magnetic path portion 42. Similar to the inner magnetic path portion 41, the outer magnetic path portion 42 is formed by a mixture of resin and magnetic powder, such as ferrite or a metal magnetic substance. That is, the outer magnetic path portion 42 is made from a magnetic material.

As illustrated in FIG. 1, a second layer L2, which is approximately shaped like a square in a plan view like the first layer L1, is laminated on the upper surface of the first layer L1. The second layer L2 is made up of the first vertical wiring 51, the second vertical wiring 52, and a first magnetic layer 43.

The first vertical wiring 51 is directly coupled to a surface above the first pad 22 without any other layer interposed therebetween. The material of the first vertical wiring 51 is the same as the material of the inductor wiring 20. The first vertical wiring 51 is substantially cylindrical and the axial direction of the cylinder agrees with the up-and-down direction. In a top view, the diameter of the first vertical wiring 51 that is approximately circular is slightly smaller than the diameter of the first pad 22.

The second vertical wiring 52 is directly coupled to a surface above the second pad 23 without any other layer interposed therebetween. The material of the second vertical wiring 52 is the same as the material of the inductor wiring 20. The second vertical wiring 52 is substantially cylindrical and the axial direction of the cylinder agrees with the up-and-down direction. In a top view, the diameter of the second vertical wiring 52 that is approximately circular is slightly smaller than the diameter of the second pad 23. Although illustrated while distinguished, the inductor wiring 20, the first dummy wiring 31, the second dummy wiring 32, the first vertical wiring 51, and the second vertical wiring 52 are integrated.

In the second layer L2, the portion aside from the first vertical wiring 51 and the second vertical wiring 52 constitutes the first magnetic layer 43. Accordingly, the first magnetic layer 43 is arranged at the side of a first surface, which is the upper surface of the inductor wiring 20. Similar to the inner magnetic path portion 41 and the outer magnetic path portion 42 described above, the first magnetic layer 43 is formed by a mixture of resin and magnetic powder, such as ferrite or a metal magnetic substance. Thus, the first magnetic layer 43 is made from a magnetic material.

A third layer L3, which is approximately shaped like a square in a plan view like the first layer L1, is laminated under the first layer L1. The third layer L3 is made up of the insulation resin 60 and an insulation resin magnetic layer 44.

The insulation resin 60 covers the inductor wiring 20, the first dummy wiring 31, and the second dummy wiring 32 from the lower side. That is, the insulation resin 60 covers all of the lower surface of the conductive portion of the first layer L1. In a top view, the insulation resin 60 is shaped so as to cover a range slightly larger than the outer edges of the inductor wiring 20, the first dummy wiring 31, and the second dummy wiring 32. As a result, the insulation resin 60 has an approximate annular shape in a top view. The material of the insulation resin 60 is insulative resin that is higher in insulation performance than the inductor wiring 20.

In the third layer L3, the portion aside from the insulation resin 60 constitutes the insulation resin magnetic layer 44. Similar to the inner magnetic path portion 41 and the outer magnetic path portion 42 described above, the insulation resin magnetic layer 44 is formed by a mixture of resin and magnetic powder, such as ferrite or a metal magnetic substance. Thus, the insulation resin magnetic layer 44 is made from a magnetic material.

A fourth layer L4, which is approximately shaped like a square in a plan view like the first layer L1, is laminated on the lower surface of the third layer L3. The fourth layer L4 constitutes a second magnetic layer 45. That is, the second magnetic layer 45 is arranged at a side of a second surface, which is the lower surface on the opposite side of the first surface as the upper surface of the inductor wiring 20, and laminated on the second surface. The second magnetic layer 45 is formed by a mixture of resin and magnetic powder, such as ferrite or a metal magnetic substance. That is, similar to the magnetic path portion 41 and the outer magnetic path portion 42 described above, the second magnetic layer 45 is made from a magnetic material. A surface of the second magnetic layer 45 where the inductor wiring 20 is arranged is referred to as a principal surface MF of the second magnetic layer 45. In the present embodiment, the normal direction substantially orthogonal to the principal surface MF of the fourth layer L4, that is, the second magnetic layer 45 is in the up-and-down direction and is identical to the lamination direction of the four layers.

In the inductor component 10, a magnetic layer 40 is made up of the inner magnetic path portion 41, the outer magnetic path portion 42, the first magnetic layer 43, the insulation resin magnetic layer 44, and the second magnetic layer 45. The inner magnetic path portion 41, the outer magnetic path portion 42, the first magnetic layer 43, the insulation resin magnetic layer 44, and the second magnetic layer 45 are coupled and surround the inductor wiring 20. Thus, the magnetic layer 40 forms a closed magnetic path with respect to the inductor wiring 20. Although illustrated while distinguished, the inner magnetic path portion 41, the outer magnetic path portion 42, the first magnetic layer 43, the insulation resin magnetic layer 44, and the second magnetic layer 45 are integrated as the magnetic layer 40.

Figure 3:
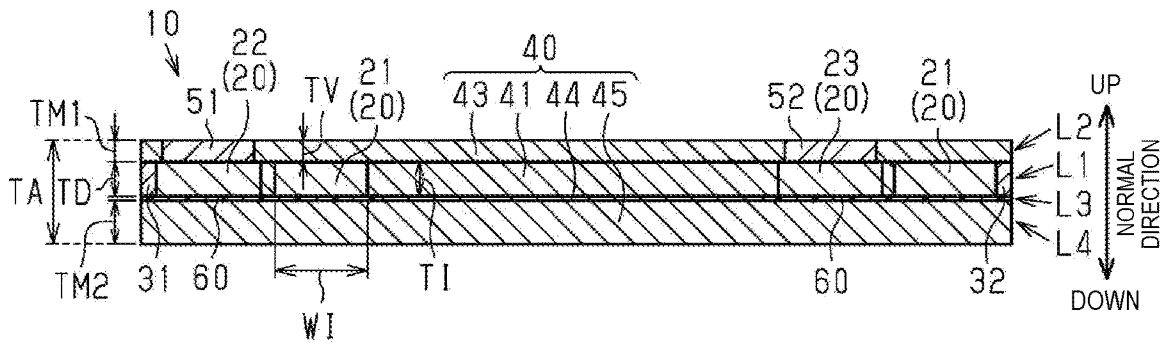
FIG. 3 is a cross-sectional view of the inductor component according to the first embodiment.

As illustrated in FIG. 3, a thickness of the first layer L1 as a measurement in the up-and-down direction is approximately 70 μm. Accordingly, an inductor wiring thickness TI of the inductor wiring 20 as a measurement in the up-and-down direction is approximately 70 μm. A dummy wiring thickness TD of the first dummy wiring 31 and the second dummy wiring 32 as a measurement in the up-and-down direction is approximately 70 μm, which is the same as the inductor wiring thickness TI.

A measurement in the direction substantially orthogonal to the inductor wiring thickness TI in a cross section substantially perpendicular to the direction in which the wiring body 21 of the inductor wiring 20 extends is referred to as an inductor wiring width WI as illustrated in FIG. 2. In this case, in the inductor component 10, the inductor wiring width WI is larger than the inductor wiring thickness TI that is approximately 70 μm. In the present embodiment, the inductor wiring width WI has an arithmetic mean value of the wiring widths in three points included in the wiring body 21, which are a central position as a center between the outer track end portion 21A and the inner track end portion 21B, a position deviating from the central position toward the outer track end portion 21A by approximately 100 μm, and a position deviating from the central position toward the inner track end portion 21B by approximately 100 μm. In the present embodiment, the inductor wiring width WI of the wiring body 21 of the inductor wiring 20 is approximately fixed. Further, in the present embodiment, the inductor wiring thickness TI has an arithmetic mean value of the wiring thicknesses in three points included in the wiring body 21, which are a central position as a center between the outer track end portion 21A and the inner track end portion 21B, a position deviating from the central position toward the outer track end portion 21A by approximately 100 μm, and a position deviating from the central position toward the inner track end portion 21B by approximately 100 μm. In the present embodiment, the inductor wiring thickness TI of the inductor wiring 20 is approximately fixed. Further, when the inductor wiring width WI and the inductor wiring thickness TI are measured, the wiring thickness can be obtained simply by measuring the maximum value of a measurement in the up-and-down direction in a cross section and the wiring width can be obtained simply by measuring the maximum value of a measurement in the direction substantially orthogonal to the up-and-down direction in a cross section.

A measurement in the direction substantially orthogonal to the dummy wiring thickness TD in a cross section substantially perpendicular to the direction in which the first dummy wiring 31 extends is referred to as a dummy wiring width WD as illustrated in FIG. 2. In this case, in the inductor component 10, the dummy wiring width WD is smaller than the inductor wiring width WI. In the present embodiment, the width of the second dummy wiring 32 is identical to the dummy wiring width WD, which is the width of the first dummy wiring 31. The dummy wiring width WD is defined as the maximum value of a width measurement substantially orthogonal to the up-and-down direction of a surface included in the first dummy wiring 31 and exposed on the outer surface of an the inductor component 10. In the present embodiment, both of the dummy wiring widths WD of the first dummy wiring 31 and the second dummy wiring 32 are approximately fixed.

As illustrated in FIG. 3, the thickness of the second layer L2 as a measurement in the up-and-down direction is approximately 50 μm. The thicknesses of the first vertical wiring 51, the second vertical wiring 52, and the first magnetic layer 43 of the second layer L2 as measurements in the up-and-down direction are all approximately 50 μm, which is identical thereamong. Accordingly, a vertical wiring thickness TV of the first vertical wiring 51 and the second vertical wiring 52 as a measurement in the up-and-down direction is approximately 50 μm. Further, a first magnetic layer thickness TM1 of the first magnetic layer 43 as a measurement in the up-and-down direction is approximately 50 μm. That is, the first vertical wiring 51 and the second vertical wiring 52 penetrate the first magnetic layer 43 in the up-and-down direction.

The thickness of the third layer L3 as a measurement in the up-and-down direction is approximately 20 μm. Also, the thicknesses of the insulation resin 60 and the insulation resin magnetic layer 44 of the third layer L3 as measurements in the up-and-down direction are both approximately 20 μm, which is identical therebetween.

The thickness of the fourth layer L4 as a measurement in the up-and-down direction is approximately 100 μm. Accordingly, a second magnetic layer thickness TM2 of the second magnetic layer 45 of the fourth layer L4 as a measurement in the up-and-down direction is approximately 100 μm. As a result, an inductor component thickness TA of the inductor component 10, obtained by combining the first layer L1 to the fourth layer L4, as a measurement in the up-and-down direction is approximately 0.240 mm.

When the above-described thicknesses are compared, the first magnetic layer thickness TM1 is smaller than the second magnetic layer thickness TM2. In addition, the inductor wiring thickness TI is approximately 1.4 times the vertical wiring thickness TV and is larger than approximately 0.5 times the vertical wiring thickness TV and smaller than approximately 1.5 times the vertical wiring thickness TV (i.e., from approximately 0.5 times the vertical wiring thickness TV to smaller than approximately 1.5 times the vertical wiring thickness TV).

Advantages of the above-described first embodiment are described below.

(1) In the above-described first embodiment, the inductor wiring thickness TI is approximately 1.4 times the vertical wiring thickness TV. Thus, if the inductor wiring thickness TI is within a range larger than approximately 0.5 times the vertical wiring thickness TV and smaller than approximately 1.5 times the vertical wiring thickness TV (i.e., from larger than approximately 0.5 times the vertical wiring thickness TV to smaller than approximately 1.5 times the vertical wiring thickness TV), it can be said that the difference between the inductor wiring thickness TI and the vertical wiring thickness TV is not excessively large. Accordingly, extensive change in manufacturing apparatus or machining conditions is unnecessary between the formation of the inductor wiring 20 and the formation of the first vertical wiring 51 and the second vertical wiring 52 such that the inductor wiring 20 and the first vertical wiring 51 and the second vertical wiring 52 can be formed with similar manufacturing apparatuses or on similar conditions. As a result, the efficiency in manufacturing the inductor component 10 can be raised.

(2) In the above-described first embodiment, the first magnetic layer thickness TM1 is smaller than the second magnetic layer thickness TM2. For this feature, the inductor component thickness TA can be suppressed in a relatively small value. For example, the inductor component thickness TA indicates approximately 0.240 mm, which is approximately 0.300 mm or smaller as a relatively small value. Although the smallness of the first magnetic layer thickness TM1 can cause leakage of magnetic flux from the magnetic layer 40 in most cases, excessive leakage of the magnetic flux can be suppressed from the inductor component 10 because the inductor wiring 20 is a single layer and the magnetic flux density is low accordingly.

In particular, the inductor wiring thickness TI is smaller than approximately 1.5 times the vertical wiring thickness TV, that is, the first magnetic layer thickness TM1 is larger than approximately two-thirds times the inductor wiring thickness TI. Thus, occurrence of excessive leakage of magnetic flux can be suppressed.

(3) In the above-described first embodiment, the inductor wiring thickness TI is smaller than the inductor wiring width WI. Accordingly, on the condition that the cross-sectional area of the inductor wiring 20 is identical, the inductor wiring thickness TI can be made relatively small. This can contribute to decrease in the thickness of the entire inductor component 10.

(4) In the above-described first embodiment, the upper surface of the inductor wiring 20 is in contact with the first vertical wiring 51, the second vertical wiring 52, and the first magnetic layer 43 without any other layer interposed therebetween. In other words, another layer, such as an insulation layer, is not laminated on the upper surface of the inductor wiring 20. Accordingly, it is unnecessary to form vias in a layer laminated on the upper surface of the inductor wiring 20 so as to secure electrical conduction between the inductor wiring 20, and the first vertical wiring 51 and the second vertical wiring 52. This can contribute to simplification of the manufacturing method.

(5) In the above-described first embodiment, the proportion of copper is approximately 99 wt % or more and that of sulfur is approximately 0.1 wt % or more and less than approximately 1.0 wt % (i.e., from approximately 0.1 wt % to less than approximately 1.0 wt %). Accordingly, by employing copper, relatively low cost and low resistance can be achieved. Further, impurity is caused in the grain boundary of copper by adding sulfur and the sulfur as the impurity can lessen stress.

Second Embodiment

A second embodiment of an inductor component is described below. A major difference between an inductor component 110 according to the second embodiment described below and the inductor component 10 according to the first embodiment is the shape of the inductor wiring.

Figure 4:
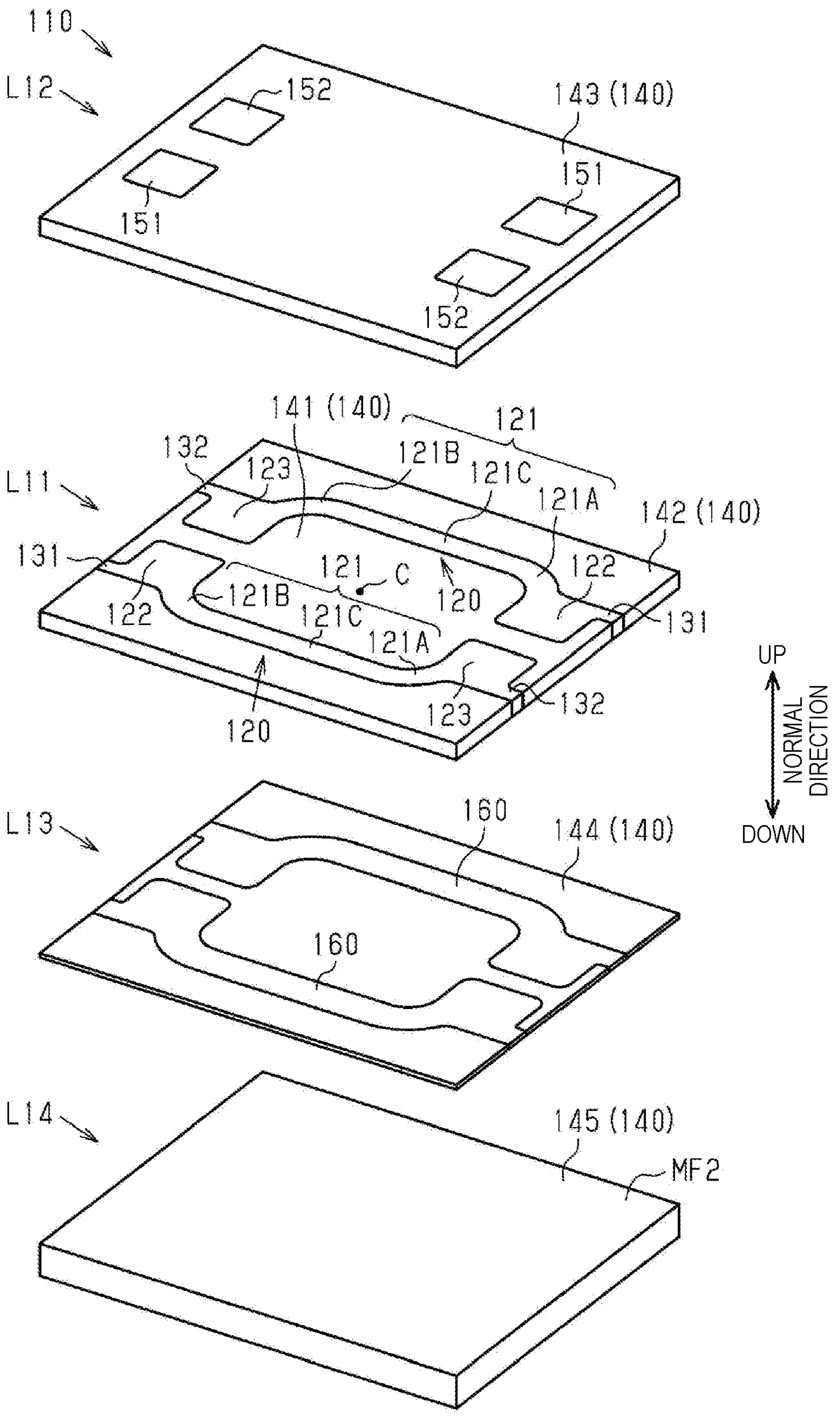
FIG. 4 is an exploded perspective view of an inductor component according to a second embodiment.

As illustrated in FIG. 4, the inductor component 110 as a whole has a structure in which four layers approximately like thin plates are laminated in the thickness direction. In the description below, the direction in which the four layers are laminated is referred to as the up-and-down direction. In FIG. 4, the illustration of an insulation layer 170 and an external terminal 180, described later, is omitted.

A first layer L11 is made up of two units of inductor wiring 120, two units of first dummy wiring 131, two units of second dummy wiring 132, an inner magnetic path portion 141, and an outer magnetic path portion 142. In a top view, the first layer L11 is approximately rectangular.

Figure 5:
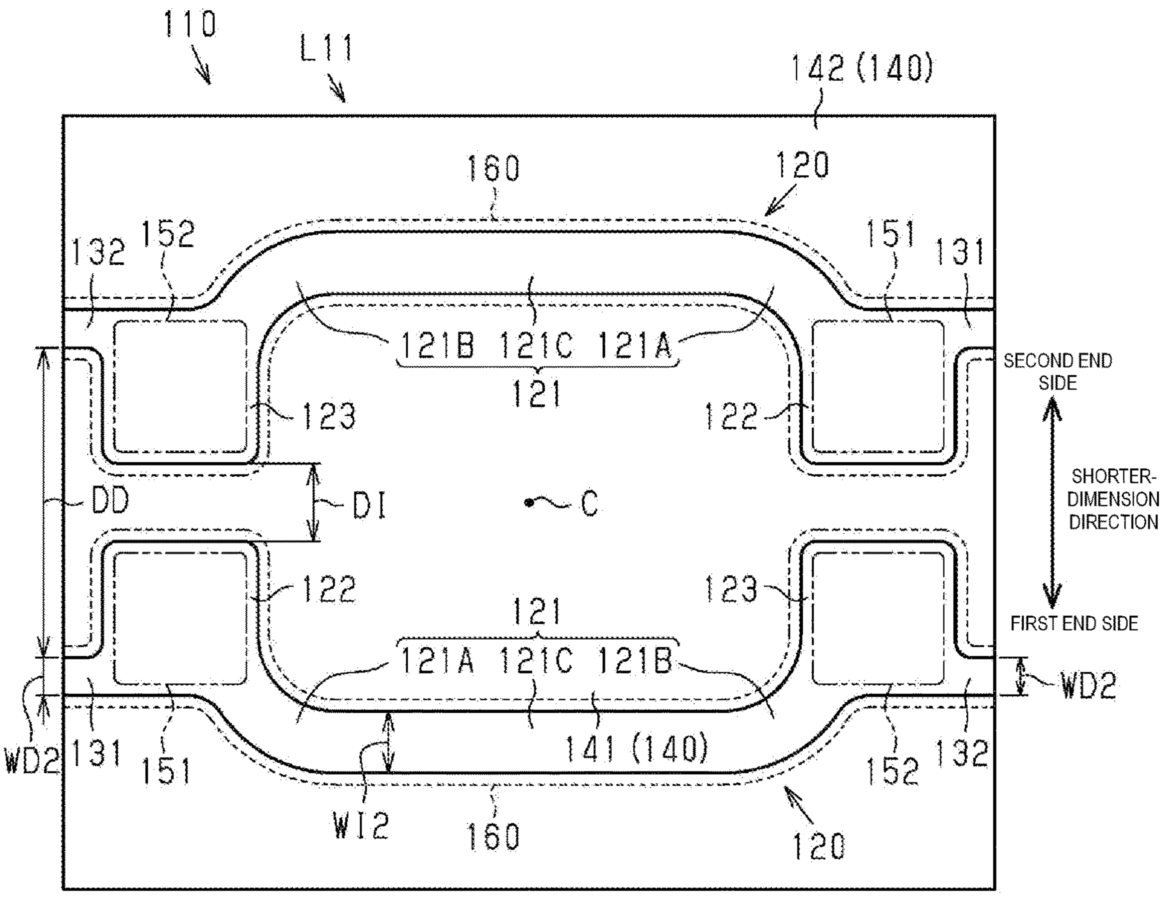
FIG. 5 is a transparent top view of the inductor component according to the second embodiment.

As illustrated in FIG. 5, in the first layer L11, the inductor wiring 120 is made up of a wiring body 121, a first pad 122, and a second pad 123. In a top view, the wiring body 121 extends in a longer-dimension direction of the approximate rectangle of the first layer L11. A central portion 121C present in the direction in which the wiring body 121 runs extends like an approximately straight line, and a first end portion 121A on one side in the direction in which the wiring body 121 runs and a second end portion 121B on the other side bend. The first end portion 121A and the second end portion 121B of the wiring body 121 each bend by approximately 90 degrees so as to face toward a central portion in a shorter-dimension direction of the first layer L11. In FIG. 5, first vertical wiring 151 and second vertical wiring 152, which are described later, are indicated with chain double-dashed lines and insulation resin 160 is indicated with broken lines.

The angle by which the inductor wiring 120 is wound in one end portion is approximately 90 degrees, which totals approximately 180 degrees in both end portions. Accordingly, in the present embodiment, the number of turns by which the inductor wiring 120 is wound is substantially 0.5.

The inductor wiring 120 is made from a conductive material and in the composition of the inductor wiring 120 in the present embodiment, the proportion of copper is approximately 99 wt % or more and that of sulfur is approximately 0.1 wt % or more and less than approximately 1.0 wt % (i.e., from approximately 0.1 wt % to less than approximately 1.0 wt %).

As illustrated in FIG. 4, the first pad 122 is coupled to the first end portion 121A of the inductor wiring 120. In a top view, the first pad 122 is approximately shaped like a square. The material of the first pad 122 is the same as the material of the wiring body 121.

The first dummy wiring 131 extends from the first pad 122 to an outer edge of the first layer L11. The first dummy wiring 131 extends to a side surface of the first layer L11 and is exposed on an outer surface of the inductor component 110.

The second pad 123 is coupled to the second end portion 121B of the inductor wiring 120. In a top view, the second pad 123 is approximately shaped like a square. The material of the second pad 123 is the same as the material of the wiring body 121.

The second dummy wiring 132 extends from the second pad 123 to an outer edge of the first layer L11. The second dummy wiring 132 extends to a side surface of the first layer L11 and is exposed on the outer surface of the inductor component 110.

A center C of an approximate rectangle shaped by the upper surface of the first layer L11 equals an intersection point of a substantially straight line that passes through the center of the first layer L11 in a shorter-dimension direction and is parallel to a longer-dimension direction of the first layer L11 and a substantially straight line that passes through the center of the first layer L11 in the shorter-dimension direction and is parallel to the shorter-dimension direction of the first layer L11. The first layer L11 has a structure rotationally symmetrical by approximately 180 degrees when an axis in the normal direction that passes through the center C as the intersection point of these lines serves as the center of the rotation. Accordingly, on a second end side in the shorter-dimension direction of the first layer L11, the same structure as the structure on a first end side in the shorter-dimension direction of the first layer L11 is made. In the drawings, identical references are given and the description is omitted.

In the first layer L11, a region further inside than the inductor wiring 120 constitutes the inner magnetic path portion 141. The inner magnetic path portion 141 is formed by a mixture of resin and magnetic powder, such as ferrite or a metal magnetic substance. That is, the inner magnetic path portion 141 is made from a magnetic material. In the first layer L11, a region further outside than the inductor wiring 120 constitutes the outer magnetic path portion 142. Similar to the inner magnetic path portion 141, the outer magnetic path portion 142 is formed by a mixture of resin and magnetic powder, such as ferrite or a metal magnetic substance. Thus, the outer magnetic path portion 142 is made from a magnetic material.

As illustrated in FIG. 4, a second layer L12, which is approximately rectangular in a plan view like the first layer L11, is laminated on the upper surface of the first layer L11. The second layer L12 is made up of the two units of first vertical wiring 151, the two units of second vertical wiring 152, and a first magnetic layer 143.

The first vertical wiring 151 is coupled to the upper surface of the first pad 122 without any other layer interposed therebetween. The material of the first vertical wiring 151 is the same as the material of the inductor wiring 120. The first vertical wiring 151 is approximately shaped like a quadrangular prism and the axial direction of the approximate quadrangular prism agrees with the up-and-down direction. In a top view, the measurement of each side of the first vertical wiring 151 approximately shaped like a square is slightly smaller than the measurement of each side of the first pad 122 approximately shaped like a square.

The second vertical wiring 152 is coupled to the upper surface of the second pad 123 without any other layer interposed therebetween. The material of the second vertical wiring 152 is the same as the material of the inductor wiring 120. The second vertical wiring 152 is approximately shaped like a quadrangular prism and the axial direction of the approximate quadrangular prism agrees with the up-and-down direction. In a top view, the measurement of each side of the second vertical wiring 152 approximately shaped like a square is slightly smaller than the measurement of each side of the second pad 123 approximately shaped like a square. Although illustrated while distinguished, the inductor wiring 120, the first dummy wiring 131, the second dummy wiring 132, the first vertical wiring 151, and the second vertical wiring 152 are integrated.

In the second layer L12, the portion aside from the first vertical wiring 151 and the second vertical wiring 152 constitutes the first magnetic layer 143. Accordingly, the first magnetic layer 143 is arranged on the side of a first surface, which is the upper surface of the inductor wiring 120. Similar to the inner magnetic path portion 141 and the outer magnetic path portion 142 described above, the first magnetic layer 143 is formed by a mixture of resin and magnetic powder, such as ferrite or a metal magnetic substance. Thus, the first magnetic layer 143 is made from a magnetic material.

Figure 6:
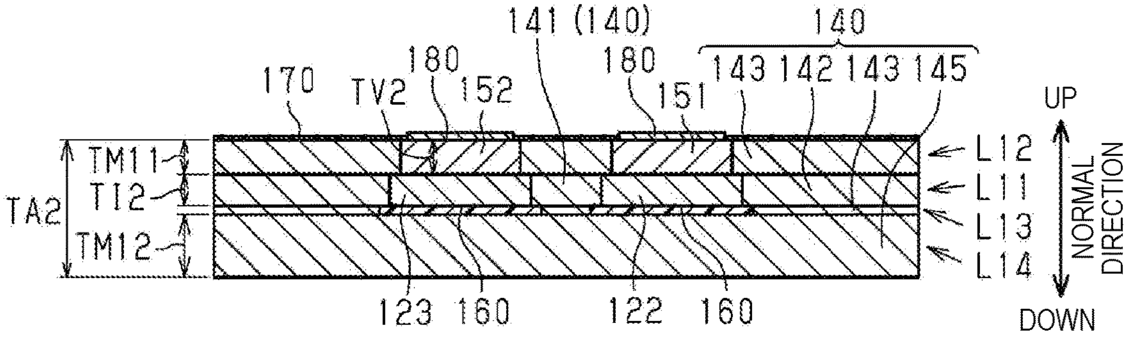
FIG. 6 is a cross-sectional view of the inductor component according to the second embodiment.

As illustrated in FIG. 6, the insulation layer 170 and the external terminals 180 are arranged on the upper surface of the second layer L12. Specifically, the external terminals 180 are coupled to the upper surfaces of the two units of first vertical wiring 151 and the two units of second vertical wiring 152. The external terminal 180 is made from a conductive material and, in the present embodiment, has a three-layer structure of copper, nickel, and gold.

The range that is included in the upper surface of the second layer L12 and is not covered with the external terminals 180 is covered with the insulation layer 170. The insulation layer 170 is higher in insulation performance than the first magnetic layer 143 and, in the present embodiment, the insulation layer 170 is a solder resist.

As illustrated in FIG. 4, a third layer L13, which is approximately rectangular in a plan view like the first layer L11, is laminated on the lower surface of the first layer L11. The third layer L13 is made up of two units of insulation resin 160 and an insulation resin magnetic layer 144.

The insulation resin 160 covers the inductor wiring 120, the first dummy wiring 131, and the second dummy wiring 132 from the lower side. That is, the insulation resin 160 covers all of the lower surface of the conductive portion of the first layer L11. In a top view, the insulation resin 160 is shaped so as to cover a range slightly larger than the outer edges of the inductor wiring 120, the first dummy wiring 131, and the second dummy wiring 132. Accordingly, the insulation resin 160 is approximately shaped like a belt that extends in a longer-dimension direction of the third layer L3 and the two units of insulation resin 160 are parallel in a shorter-dimension direction of the third layer L3. The insulation resin 160 is insulative resin and is higher in insulation performance than the inductor wiring 120.

In the third layer L13, the portion aside from the insulation resin 160 constitutes the insulation resin magnetic layer 144. Similar to the inner magnetic path portion 141 and the outer magnetic path portion 142 described above, the insulation resin magnetic layer 144 is formed by a mixture of resin and magnetic powder, such as ferrite or a metal magnetic substance. Thus, the insulation resin magnetic layer 144 is made from a magnetic material.

A fourth layer L14, which is approximately rectangular in a plan view like the first layer L11, is laminated on the lower surface of the third layer L13. The fourth layer L14 constitutes a second magnetic layer 145. Thus, the second magnetic layer 145 is laminated on a second surface, which is the lower surface on the opposite side of the first surface as the upper surface of the inductor wiring 120. The second magnetic layer 145 is formed by a mixture of resin and magnetic powder, such as ferrite or a metal magnetic substance. That is, similar to the magnetic path portion 141 and the outer magnetic path portion 142 described above, the second magnetic layer 145 is made from a magnetic material. A surface of the second magnetic layer 145 where the inductor wiring 120 is arranged is referred to as a principal surface MF2 of the second magnetic layer 145. In the present embodiment, the normal direction substantially orthogonal to the principal surface MF2 of the fourth layer L14, that is, the second magnetic layer 145 is in the up-and-down direction and is identical to the lamination direction of the four layers.

In the inductor component 110, a magnetic layer 140 is made up of the inner magnetic path portion 141, the outer magnetic path portion 142, the first magnetic layer 143, the insulation resin magnetic layer 144, and the second magnetic layer 145. The inner magnetic path portion 141, the outer magnetic path portion 142, the first magnetic layer 143, the insulation resin magnetic layer 144, and the second magnetic layer 145 are coupled and surround the inductor wiring 120. Thus, the magnetic layer 140 forms a closed magnetic path with respect to the inductor wiring 120. Although illustrated while distinguished, the inner magnetic path portion 141, the outer magnetic path portion 142, the first magnetic layer 143, the insulation resin magnetic layer 144, and the second magnetic layer 145 are integrated as the magnetic layer 140.

As illustrated in FIG. 5, a minimum distance DI between the two units of inductor wiring 120 equals the distance between the first pad 122 of one of the two units of inductor wiring 120 and the second pad 123 of the other unit of inductor wiring 120. The minimum distance DI is longer than or equal to approximately 20 times the mean particle diameter of magnetic powder contained in the inner magnetic path portion 141. The mean particle diameter of the magnetic powder is measured using a scanning electron microscope (SEM) image of a cross section that passes through the center of the magnetic layer 40 in a state of the inductor component 110. Specifically, on an SEM image under a magnification that enables identification of approximately 15 or more pieces of magnetic powder, the area of each piece of magnetic powder is measured and the circle equivalent diameters are determined from $\{4/\pi\times(\text{area})\}^\wedge(1/2)$, and then the arithmetic mean value thereof is regarded as the mean particle diameter of the magnetic powder. At the stage of a raw material, the mean particle diameter of the magnetic powder is measured by laser diffraction scattering in the raw material state of a metal magnetic substance. The particle diameter equivalent to the integrated value of approximately 50% in the particle size distribution, which is determined by the laser diffraction scattering, is regarded as the mean particle diameter of the magnetic powder.

A minimum distance DD between the units of dummy wiring coupled to the two units of inductor wiring 120 equals a distance between the first dummy wiring 131 of one of the two units of the inductor wiring 120 and the second dummy wiring 132 of the other unit of inductor wiring 120. The minimum distance DD between the units of dummy wiring coupled to the two units of inductor wiring 120 is longer than the minimum distance DI between the two units of inductor wiring 120.

As illustrated in FIG. 6, the thickness of the first layer L11 as a measurement in the up-and-down direction is approximately 45 μm. Accordingly, an inductor wiring thickness TI2 of the inductor wiring 120 as a measurement in the up-and-down direction is approximately 45 μm. Accordingly, the inductor wiring thickness TI2 is approximately 40 μm or larger and approximately 55 μm or smaller (i.e., from approximately 40 μm to approximately 55 μm). The dummy wiring thickness of the first dummy wiring 131 and the second dummy wiring 132 as a measurement in the up-and-down direction is approximately 45 μm, which is the same as the inductor wiring thickness TI2.

A measurement in the direction substantially orthogonal to the inductor wiring thickness TI2 in a cross section substantially perpendicular to the direction in which the wiring body 121 of the inductor wiring 120 extends is referred to as an inductor wiring width WI2 as illustrated in FIG. 5. In this case, in the inductor component 110, the inductor wiring width WI2 is larger than the inductor wiring thickness TI2 that is approximately 45 μm. In the present embodiment, the inductor wiring width WI2 has an arithmetic mean value of the wiring widths in three points included in the wiring body 121, which are a central position as a center between the first end portion 121A and the second end portion 121B, a position deviating from the central position toward the first end portion 121A by approximately 100 μm, and a position deviating from the central position toward the second end portion 121B by approximately 100 μm. In the present embodiment, the inductor wiring width WI2 of the wiring body 121 of the inductor wiring 120 is approximately fixed. In the present embodiment, the inductor wiring thickness TI2 has an arithmetic mean value of the wiring thicknesses in three points included in the wiring body 121, which are a central position as a center between the first end portion 121A and the second end portion 121B, a position deviating from the central position toward the first end portion 121A by approximately 100 μm, and a position deviating from the central position toward the second end portion 121B by approximately 100 μm. In the present embodiment, the inductor wiring thickness TI2 of the inductor wiring 120 is approximately fixed. Further, when the inductor wiring width WI2 and the inductor wiring thickness TI2 are measured, the wiring thickness can be obtained simply by measuring the maximum value of a measurement in the up-and-down direction in a cross section and the wiring width can be obtained simply by measuring the maximum value of a measurement in the direction substantially orthogonal to the up-and-down direction in a cross section.

A measurement in the direction substantially orthogonal to the dummy wiring thickness in a cross section substantially perpendicular to the direction in which the first dummy wiring 131 extends is referred to as a dummy wiring width WD2 as illustrated in FIG. 5. In this case, in the inductor component 110, the dummy wiring width WD2 is smaller than the inductor wiring width WI2. In the present embodiment, the width of the second dummy wiring 132 is identical to the dummy wiring width WD2, which is the width of the first dummy wiring 131. The dummy wiring width WD2 is defined as the maximum value of a width measurement substantially orthogonal to the up-and-down direction of a surface included in the first dummy wiring 131 and exposed on the outer surface of an the inductor component 110. In the present embodiment, both of the dummy wiring widths WD2 of the first dummy wiring 131 and the second dummy wiring 132 are approximately fixed.

As illustrated in FIG. 6, the thickness of the second layer L12 as a measurement in the up-and-down direction is approximately 50 μm. The thicknesses of the first vertical wiring 151, the second vertical wiring 152, and the first magnetic layer 143 of the second layer L12 as measurements in the up-and-down direction are all approximately 50 μm, which is identical thereamong. Accordingly, a vertical wiring thickness TV2 of the first vertical wiring 151 and the second vertical wiring 152 as a measurement in the up-and-down direction is approximately 50 μm. Further, a first magnetic layer thickness TM11 of the first magnetic layer 143 as a measurement in the up-and-down direction is approximately 50 μm. That is, the first vertical wiring 151 and the second vertical wiring 152 penetrate the first magnetic layer 143 in the up-and-down direction.

The thickness of the insulation layer 170, which covers the upper surface of the second layer L12, as a measurement in the up-and-down direction is approximately 10 μm. Further, the thickness of the external terminal 180, which covers the upper surface of the second layer L12, as a measurement in the up-and-down direction is approximately 11 μm. Accordingly, the thickness of the external terminal 180 is slightly larger than the thickness of the insulation layer 170.

The thickness of the third layer L13 as a measurement in the up-and-down direction is approximately 10 μm. Also, the thicknesses of the insulation resin 160 and the insulation resin magnetic layer 144 of the third layer L13 as measurements in the up-and-down direction are both approximately 10 μm, which is identical therebetween.

The thickness of a fourth layer L14 as a measurement in the up-and-down direction is approximately 90 μm. Accordingly, a second magnetic layer thickness TM12 of the second magnetic layer 145 of the fourth layer L14 as a measurement in the up-and-down direction is approximately 90 μm. As a result, the inductor component thickness TA2 of the inductor component 110, obtained by combining the first layer L11 to the fourth layer L14, as a measurement in the up-and-down direction is approximately 0.206 mm.

When the above-described thicknesses are compared, the first magnetic layer thickness TM11 is smaller than the second magnetic layer thickness TM12. In addition, the inductor wiring thickness TI2 is approximately 0.9 times the vertical wiring thickness TV2 and is larger than approximately 0.5 times the vertical wiring thickness TV2 and smaller than approximately 1.5 times the vertical wiring thickness TV2 (i.e., from larger than approximately 0.5 times the vertical wiring thickness TV2 to smaller than approximately 1.5 times the vertical wiring thickness TV2).

Actions and advantages of the above-described second embodiment are described below. The following advantages can be obtained in addition to the above-described advantages (1) to (5) of the first embodiment.

(6) In the above-described second embodiment, the number of turns of the inductor wiring 120 is less than approximately 1.0. Accordingly, direct current resistance of the inductor wiring 120 can be made small and relatively large current can be caused to flow. Also, since the number of turns of the inductor wiring 120 is small, the proportion of the volume of the inductor wiring 120 in the volume of the entire inductor component 110 can be made small. Thus, as the proportion of the volume of the magnetic layer 140 becomes relatively larger, decrease in the rate of inductance acquisition relative to the volume of the entire inductor component 110 can be inhibited less easily.

(7) In the above-described second embodiment, the inductor wiring thickness TI2 is approximately 40 μm or larger and approximately 55 μm or smaller (i.e., from approximately 40 μm to approximately 55 μm). Thus, since the inductor wiring thickness TI2 is approximately 55 μm or smaller, slimming down can be brought to the inductor component 110. Further, since the inductor wiring thickness TI2 is approximately 40 μm or larger, excessive increase in direct current resistance can be avoided.

(8) In the above-described second embodiment, the upper surface of the first magnetic layer 143 is covered with the insulation layer 170, and the external terminal 180 is coupled to the upper surfaces of the first vertical wiring 151 and the second vertical wiring 152. Accordingly, a short circuit between the external terminals 180 can be suppressed by the insulation layer 170.

(9) In the above-described second embodiment, the two units of inductor wiring 120 are arranged in an identical layer to the first layer L11. If the two units of inductor wiring 120 are arranged in different layers, the two units of inductor wiring 120 are arranged in parallel in the up-and-down direction. Compared with this case, in the above-described second embodiment, the two units of inductor wiring 120 are arranged in an identical layer to the first layer L11. Accordingly, increase in measurement of the inductor component 110 in the up-and-down direction can be suppressed.

(10) In the above-described second embodiment, the minimum distance DI between the two units of inductor wiring 120 is larger than or equal to 20 times the particle diameter of the magnetic powder of the magnetic layer 140. If the minimum distance DI between the two units of inductor wiring 120 is excessively small, a short circuit can be caused between the units of inductor wiring 120 through a particle of the metal magnetic substance between the units of inductor wiring 120. It can be said that, in the above-described second embodiment, the minimum distance DI between the two units of inductor wiring 120 is sufficiently ensured in comparison with the length of the particle diameter of the magnetic powder. Accordingly, a short circuit between the two units of inductor wiring 120 can be avoided easily.

(11) The wiring body 121 as a whole is approximately like a straight line that extends in the longer-dimension direction of the first layer L11, the distance between the units of wiring body 121 can become short when the units of wiring body 121 are arranged in the shorter-dimension direction of the first layer L11. In the above-described second embodiment, the minimum distance DI between the two units of inductor wiring 120 is equal to the distance between the first pad 122 coupled to one of the units of inductor wiring 120 and the second pad 123 coupled to the other unit of inductor wiring 120. Accordingly, the distance between the units of wiring body 121 of the units of inductor wiring 120 is longer than the minimum distance DI. The distance between the units of wiring body 121 can be increased by making the distance between the units of wiring body 121 longer than the distance between the pads. Accordingly, a short circuit of the units of wiring body 121 can be suppressed easily.

Embodiment of Manufacturing Method of Inductor Component

An embodiment of a manufacturing method of an inductor component is described below. Hereinafter, a manufacturing method of the inductor component 110 presented in the second embodiment is described.

Figure 7:
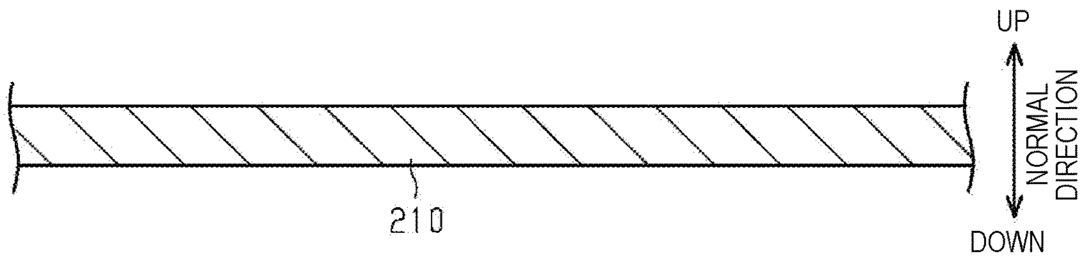
FIG. 7 is an explanatory diagram for a manufacturing method of the inductor component.

As illustrated in FIG. 7, first, a base member preparation step is performed. Specifically, a base member 210 that is approximately shaped like a plate is prepared. The material of the base member 210 is ceramic. The base member 210 is approximately rectangular in a top view, and a measurement of each side is large enough so that a plurality of inductor components 110 can be accommodated. In the description below, the direction substantially orthogonal to the plane direction of the base member 210 is referred to as the up-and-down direction.

Figure 8:
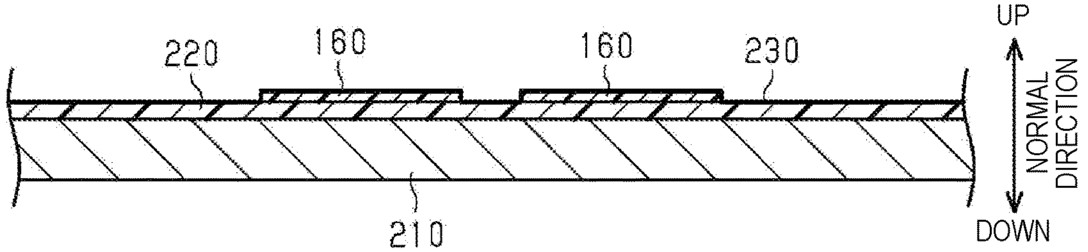
FIG. 8 is an explanatory diagram for the manufacturing method of the inductor component.

After that, as illustrated in FIG. 8, a dummy insulation layer 220 is applied throughout the upper surface of the base member 210. After that, patterning of insulation resin, which functions as the insulation resin 160, is performed by photolithography in a range slightly wider in a top view than the range in which the inductor wiring 120 is arranged.

After that, a seed layer formation step to form a seed layer 230 is performed. Specifically, the seed layer 230 of copper is formed on a first surface, which is the upper surfaces of the insulation resin 160 and the dummy insulation layer 220, by sputtering from the side of the upper surface of the base member 210. In the drawings, the seed layer 230 is indicated with bold lines.

Figure 9:
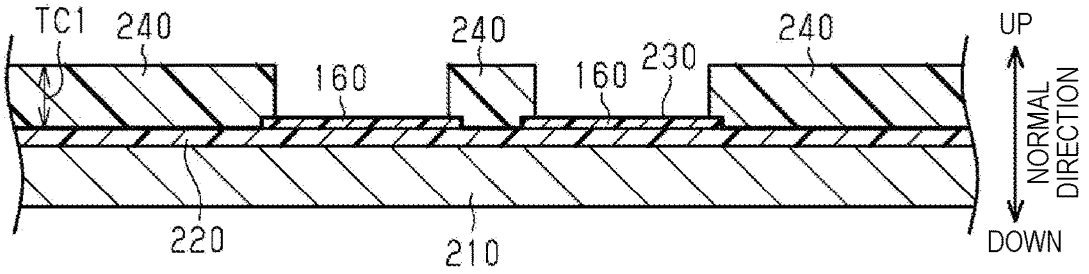
FIG. 9 is an explanatory diagram for the manufacturing method of the inductor component.

After that, as illustrated in FIG. 9, a first covering step is performed to form a first covering portion 240 that is included in the upper surface of the seed layer 230 and cover portions where the inductor wiring 120, the first dummy wiring 131, and the second dummy wiring 132 are not formed. Specifically, first, a photosensitive dry film resist is applied throughout the upper surface of the seed layer 230. After that, the entire range of the upper surface of the dummy insulation layer 220 and the upper surface of an outer edge portion of a range that is included in the upper surface of the insulation resin 160 and is covered with the insulation resin 160 undergoes exposure to light to be solidified. After that, the portion that is included in the applied dry film resist and is not solidified is peeled and removed using a chemical solution. Thus, the portion that is included in the applied dry film resist and is solidified is formed as a first covering portion 240. The seed layer 230 is exposed in the portion that is included in the applied dry film resist and is not covered with the first covering portion 240 after being removed using the chemical solution. A first covering portion thickness TC1 of the first covering portion 240 as a measurement in the up-and-down direction is slightly larger than the inductor wiring thickness TI2 of the inductor component 110 illustrated in FIG. 6. Photolithography in other steps is similar and therefore the detailed description thereof it omitted.

Figure 10:
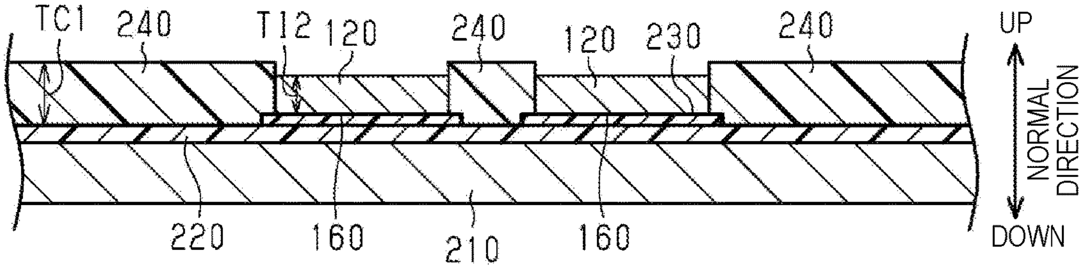
FIG. 10 is an explanatory diagram for the manufacturing method of the inductor component.

After that, as illustrated in FIG. 10, an inductor wiring processing step is performed to form the inductor wiring 120, the first dummy wiring 131, and the second dummy wiring 132 by electrolytic plating in the portion that is included in the upper surface of the insulation resin 160 and is not covered with the first covering portion 240. Specifically, electrolytic copper plating is performed so that copper is grown on the upper surface of the insulation resin 160 from the portion where the seed layer 230 is exposed. Thus, the inductor wiring 120, the first dummy wiring 131, and the second dummy wiring 132 are formed. The inductor wiring thickness TI2 of the inductor wiring 120 as a measurement in the up-and-down direction is identical to the dummy wiring thicknesses of the first dummy wiring 131 and the second dummy wiring 132 as measurements in the up-and-down direction. The inductor wiring thickness TI2 is smaller than the first covering portion thickness TC1. The inductor components 110 that are adjacent to each other across a break line DL, described later, are coupled to each other by the first dummy wiring 131 and the second dummy wiring 132. In FIG. 10, the inductor wiring 120 is illustrated while the first dummy wiring 131 and the second dummy wiring 132 are not illustrated.

Figure 11:
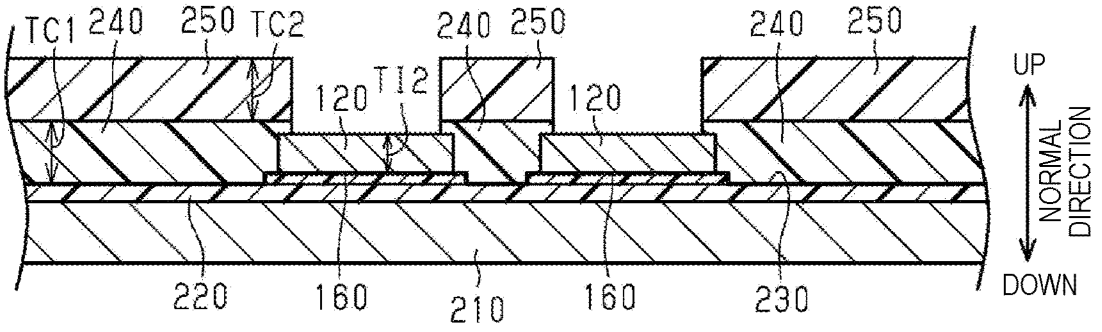
FIG. 11 is an explanatory diagram for the manufacturing method of the inductor component.

After that, as illustrated in FIG. 11, a second covering step to form a second covering portion 250 is performed. The range where the second covering portion 250 is formed equals the range where the first vertical wiring 151 and the second vertical wiring 152 are not formed, which is included in all of the upper surface of the first covering portion 240, all of the upper surface of the first dummy wiring 131, all of the upper surface of the second dummy wiring 132, and the upper surface of the inductor wiring 120. In this range, the second covering portion 250 is formed by photolithography, which is identical to the technique of forming the first covering portion 240. A second covering portion thickness TC2 of the second covering portion 250 as a measurement in the up-and-down direction is identical to the first covering portion thickness TC1.

After that, a vertical wiring processing step to form the first vertical wiring 151 and the second vertical wiring 152 is performed. Specifically, the first vertical wiring 151 and the second vertical wiring 152 are formed by electrolytic copper plating in a portion that is included in the upper surface of the inductor wiring 120 and is not covered with the second covering portion 250. In the vertical wiring processing step, an upper end of the copper grown is set so as to be slightly lower in position than the upper surface of the second covering portion 250. Specifically, the first vertical wiring 151 and the second vertical wiring 152 are formed so that a pre-shaving vertical wiring thickness TV3 of the first vertical wiring 151 and the second vertical wiring 152 as a measurement in the up-and-down direction, which is described later, is larger than two-thirds times the inductor wiring thickness TI2 and smaller than twice the inductor wiring thickness TI2 (i.e., from larger than two-thirds times the inductor wiring thickness TI2 to smaller than twice the inductor wiring thickness TI2). In the present embodiment, the pre-shaving vertical wiring thickness TV3 is set so as to be identical to the inductor wiring thickness TI2.

Figure 12:
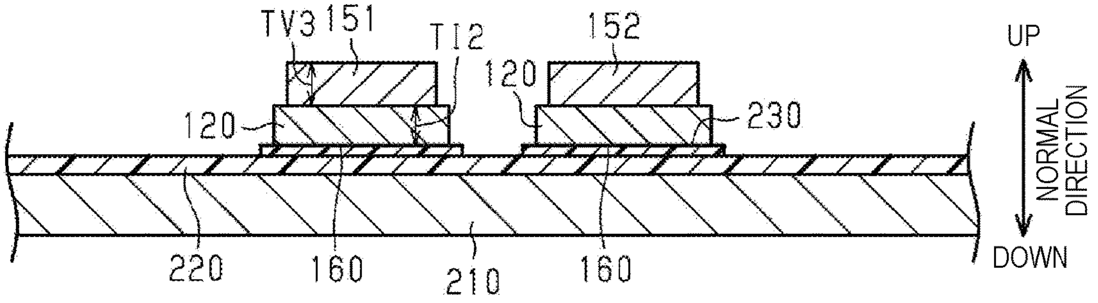
FIG. 12 is an explanatory diagram for the manufacturing method of the inductor component.

After that, as illustrated in FIG. 12, a covering portion removal step to remove the first covering portion 240 and the second covering portion 250 is performed. Specifically, part of the first covering portion 240 and the second covering portion 250 is physically grabbed, and the first covering portion 240 and the second covering portion 250 are peeled so as to be removed from the base member 210.

After that, a seed layer etching step to etch the seed layer 230 is performed. The seed layer 230 exposed is removed by performing etching on the seed layer 230. That is, the inductor wiring 120, the first dummy wiring 131, and the second dummy wiring 132 are formed by a semi additive process (SAP).

Figure 13:
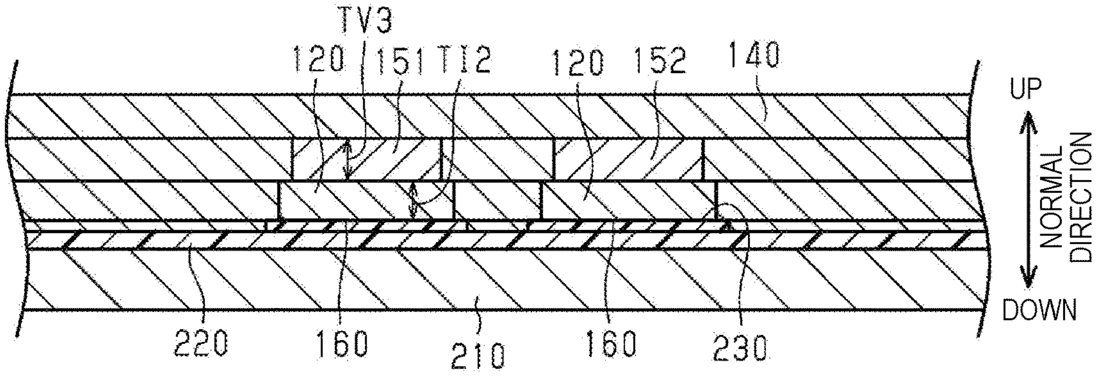
FIG. 13 is an explanatory diagram for the manufacturing method of the inductor component.

After that, as illustrated in FIG. 13, a first magnetic layer processing step to laminate the first magnetic layer 143 is performed. Specifically, first, resin containing magnetic powder, which is a material of the magnetic layer 140, is applied to the upper surface of the base member 210. At this time, the resin containing magnetic powder is applied so as to also cover the upper surfaces of the first vertical wiring 151 and the second vertical wiring 152. After that, press working is performed to form the magnetic layer 140 on the upper surface of the base member 210 by solidifying the resin containing magnetic powder. Accordingly, the first magnetic layer 143 laminated on the upper surface of the inductor wiring 120 is also formed.

Figure 14:
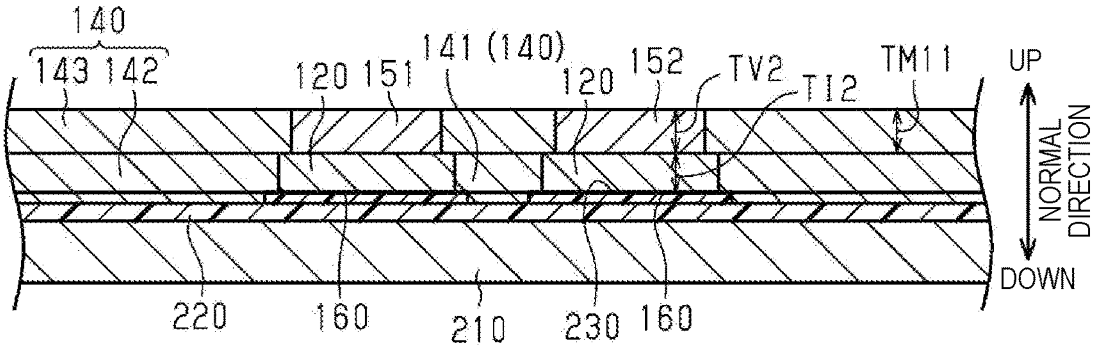
FIG. 14 is an explanatory diagram for the manufacturing method of the inductor component.

After that, as illustrated in FIG. 14, an upper-side portion of the magnetic layer 140 is shaved off until the upper surfaces of the first vertical wiring 151 and the second vertical wiring 152 are exposed. As a result, the pre-shaving vertical wiring thickness TV3 of the first vertical wiring 151 and the second vertical wiring 152 as a measurement in the up-and-down direction, which is obtained before the shaving off, equals the vertical wiring thickness TV2 that is smaller than the measurement of the copper in the up-and-down direction, which is grown in the vertical wiring processing step by the upper end portion being shaved off. The inner magnetic path portion 141, the outer magnetic path portion 142, and the first magnetic layer 143 are formed so as to be integrated, and in the drawings, the first layer L11 and the second layer L12 are illustrated while distinguished. Accordingly, the inner magnetic path portion 141, the outer magnetic path portion 142, and the first magnetic layer 143 are also illustrated while distinguished.

Figure 15:
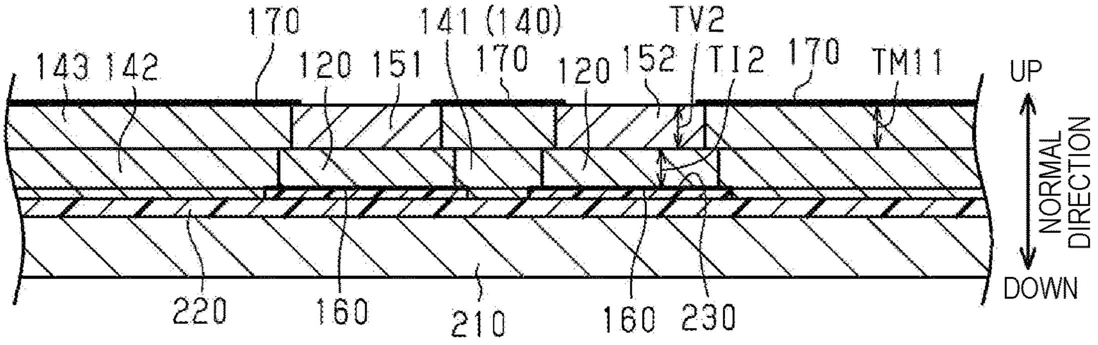
FIG. 15 is an explanatory diagram for the manufacturing method of the inductor component.

After that, as illustrated in FIG. 15, an insulation layer processing step is performed. Specifically, patterning is performed on a solder resist that functions as the insulation layer 170 by photolithography in the portion where the external terminal 180 is not formed, which is included in the upper surface of the first magnetic layer 143, the upper surface of the first vertical wiring 151, and the upper surface of the second vertical wiring 152.

Figure 16:
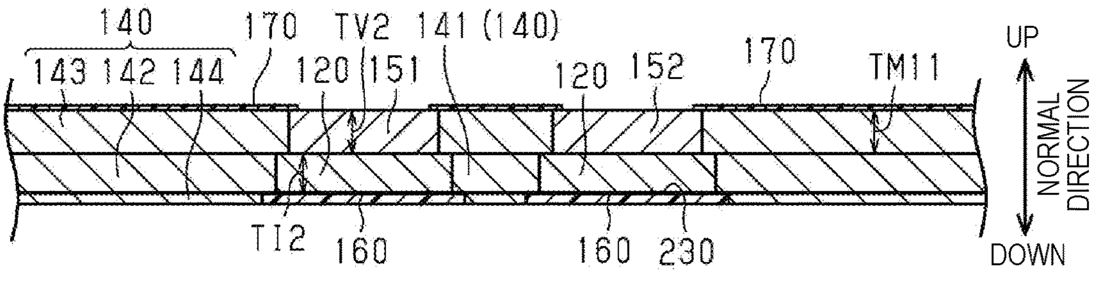
FIG. 16 is an explanatory diagram for the manufacturing method of the inductor component.

After that, as illustrated in FIG. 16, a base member shaving step is performed. Specifically, the base member 210 and the dummy insulation layer 220 are entirely removed by being shaved off. As a result of entirely shaving off the dummy insulation layer 220, part of a lower-side portion of the insulation resin 160 is also removed by being shaved off but the inductor wiring 120 is not removed.

Figure 17:
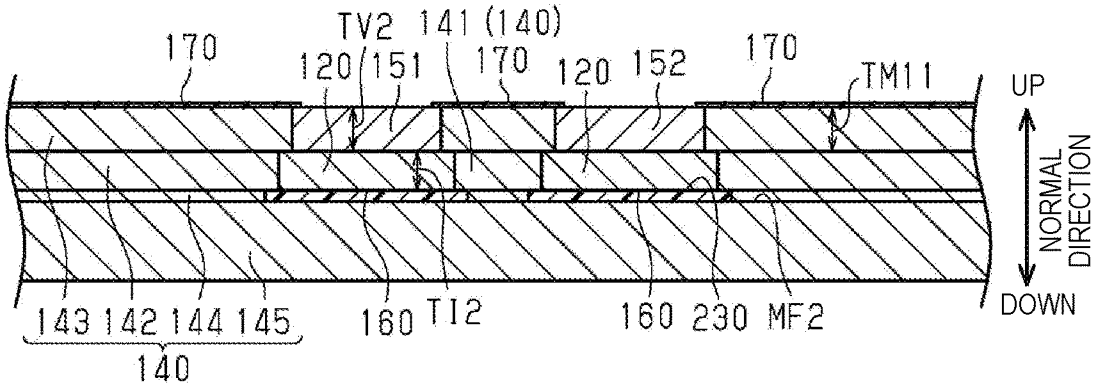
FIG. 17 is an explanatory diagram for the manufacturing method of the inductor component.

After that, as illustrated in FIG. 17, a second magnetic layer processing step to laminate the second magnetic layer 145 is performed. Specifically, first, resin containing magnetic powder, which is a material of the magnetic layer 140, is applied to the lower surface of the base member 210. After that, press working is performed to form the second magnetic layer 145 on the lower surface of the base member 210 by solidifying the resin containing magnetic powder. A surface of the second magnetic layer 145 where the inductor wiring 120 is arranged is referred to as a principal surface MF2 of the second magnetic layer 145. In the present embodiment, the normal direction substantially orthogonal to the principal surface MF2 of the fourth layer L14, that is, the second magnetic layer 145 is in the up-and-down direction and is identical to the direction substantially orthogonal to the plane direction of the base member 210.

After that, a lower end portion of the second magnetic layer 145 is shaved off. For example, the lower end portion of the second magnetic layer 145 is shaved off so that a measurement from the upper surface of the external terminal 180 to the lower surface of the second magnetic layer 145 indicates a desired value. In the second magnetic layer processing step, the second magnetic layer 145 is shaved off such that a first magnetic layer thickness TM11 of the first magnetic layer 143 as a measurement in the up-and-down direction is smaller than a second magnetic layer thickness TM12 of the second magnetic layer 145 as a measurement in the up-and-down direction.

Figure 18:
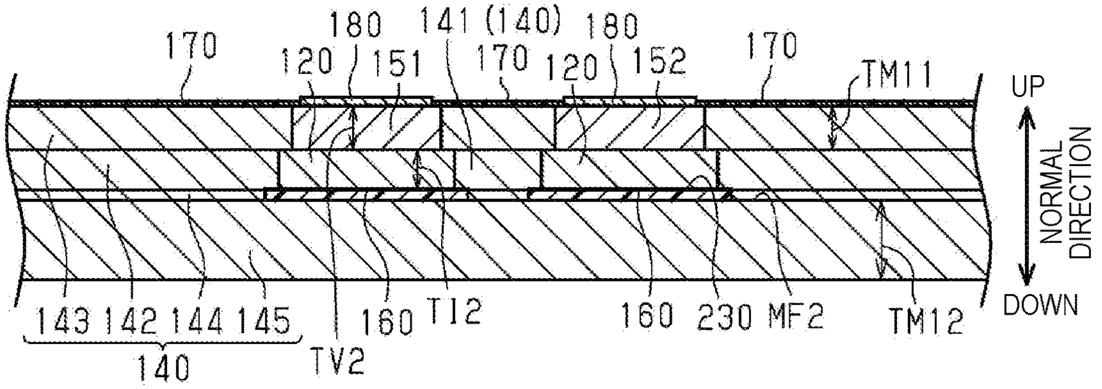
FIG. 18 is an explanatory diagram for the manufacturing method of the inductor component.

After that, as illustrated in FIG. 18, an external terminal processing step is performed. Specifically, the external terminal 180 is formed in a portion that is included in the upper surface of the first magnetic layer 143, the upper surface of the first vertical wiring 151, and the upper surface of the second vertical wiring 152 and is not covered with the insulation layer 170. The external terminal 180 is formed for each of copper, nickel, and gold by electroless plating. Thus, the external terminal 180 with a three-layer structure is formed.

Figure 19:
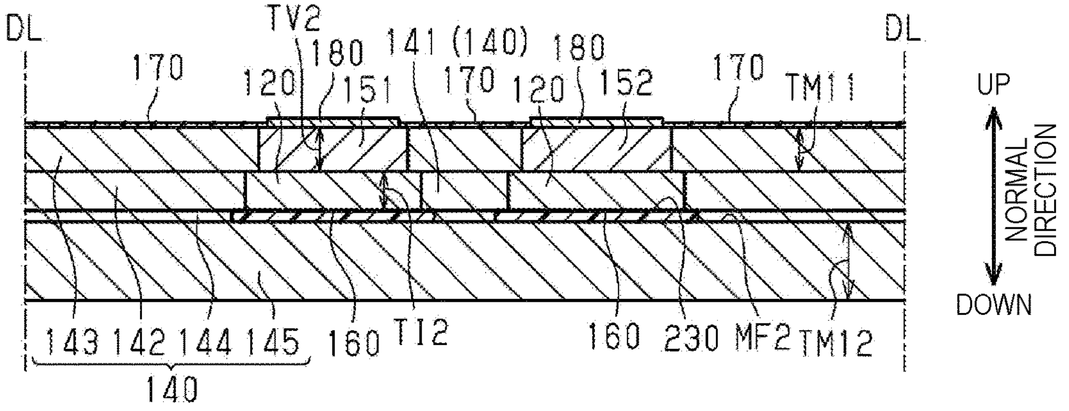
FIG. 19 is an explanatory diagram for the manufacturing method of the inductor component.

After that, as illustrated in FIG. 19, a separation machining step is performed. Specifically, the separation is performed by cutting along the break lines DL with a dicing machine. Thus, the inductor component 110 according to the second embodiment can be obtained. Also, at this time, the first dummy wiring 131 and the second dummy wiring 132 present on the break line DL are also cut, and the first dummy wiring 131 and the second dummy wiring 132 are exposed on a side surface of the inductor component 110.

Actions and advantages of the above-described manufacturing method are described below.

(12) In the above-described manufacturing method, the inductor wiring 120, the first vertical wiring 151, and the second vertical wiring 152 are formed by SAP. Accordingly, in the composition of the inductor wiring 120, the first vertical wiring 151, and the second vertical wiring 152, the proportion of copper is approximately 99 wt % or more and that of sulfur is approximately 0.1 wt % or more and less than approximately 1.0 wt % (i.e., from approximately 0.1 wt % or more to less than approximately 1.0 wt %). Thus, the inductor wiring 120, the first vertical wiring 151, and the second vertical wiring 152 can be formed in an identical step and the formation at relatively low cost can be achieved accordingly. Further, the formation in an identical step enables residual stress of copper to be equivalent in each unit of wiring and coupling reliability among units of wiring can be enhanced.

(13) In the above-described manufacturing method, the first dummy wiring 131 and the second dummy wiring 132 couple the plurality of inductor components 110. Accordingly, in the separation processing step and the steps before the separation processing step when the plurality of inductor components 110 are manufactured at one time, the potential is the same through the first dummy wiring 131 and the second dummy wiring 132 in the substrate state. As a result, in the substrate state for example, current due to static electricity, which occurs during a processing step, can be caused to flow easily by grounding one of the plurality of inductor components 110. Further, for example, in the vertical wiring processing step, the copper can be grown simply by causing current to flow in one of the plurality of inductor components 110.

(14) In the above-described manufacturing method, all of the lower surface of the inductor wiring 120 is covered with the insulation resin 160 as insulation resin. Accordingly, in the processing step, plating growth on the lower side of the inductor wiring 120 can be suppressed. In this regard, the similar applies to the first embodiment and the second embodiment.

Each of the above-described embodiments can be implemented as described below. Each embodiment and variations presented below can be implemented by being combined such that no technical contradiction arises.

In each embodiment of the above-described inductor component, the structure, shape, material, and the like of the inductor wiring is not particularly limited as long as the inductor component can give inductance to the inductor component by causing magnetic flux in the magnetic layer when current flows. For example, the first pad and the second pad can be omitted from the inductor wiring. In the first embodiment, the inductor wiring 20 may be approximately shaped like a curve, the number of turns of which is less than approximately 1.0, or like an approximately straight line, the number of turns of which is approximately zero. In the second embodiment, the inductor wiring 120 may be approximately shaped like a curve, the number of turns of which is approximately 1.0 or more. In each embodiment, the inductor wiring 20 may be approximately shaped like a meander.

In each embodiment of the above-described inductor component, the inductor wiring thickness may be larger than inductor wiring width.

In each embodiment of the above-described inductor component, the composition of the inductor wiring is not limited to the example in each embodiment described above.

In each embodiment of the above-described inductor component, the inductor wiring thickness is not limited to the example in each embodiment described above. For example, in the first embodiment, the inductor wiring thickness TI may be smaller than approximately 40 μm, and in the second embodiment, the inductor wiring thickness TI2 may be larger than approximately 55 μm.

In each embodiment of the above-described inductor component, in the relation between the inductor wiring thickness and the vertical wiring thickness, the inductor wiring thickness is just desired to be larger than approximately 0.5 times the vertical wiring thickness and be smaller than approximately 1.5 times the vertical wiring thickness (i.e., from larger than approximately 0.5 times the vertical wiring thickness to smaller than approximately 1.5 times the vertical wiring thickness), and the inductor wiring thickness and the vertical wiring thickness may be equal. In this case, in the manufacturing method presented above as an example, the manufacturing conditions are just desired to be changed so that the pre-shaving vertical wiring thickness TV3 is larger than the inductor wiring thickness TI2 by an amount of what is shaved off.

In each embodiment of the above-described inductor component, the inductor wiring and the first vertical wiring may be coupled with another layer interposed therebetween. For example, a so-called via that is conductive may be interposed between the inductor wiring and the first vertical wiring. In the regard, the similar applies to the inductor wiring and the second vertical wiring.

In each embodiment of the above-described inductor component, a portion that is included in the outer surface of the inductor wiring and is aside from the portion where the first vertical wiring and the second vertical wiring are coupled may be covered with the insulation resin. In this case, for example, in a manufacturing step, after covering all of the outer surface of the inductor wiring with the insulation resin once, a via hole is made in the portion where the first vertical wiring and the second vertical wiring are coupled and a so-called via that is conductive is formed in the hole. The inductor component can be manufactured by forming the first vertical wiring and the second vertical wiring on the upper surface of the via.

In each embodiment of the above-described inductor component, the structure of the third layer may be omitted from the inductor component. In this case, the lower surface of the inductor wiring is in direct contact with the second magnetic layer without being covered with the insulation resin. Further, in the manufacturing method in this case, when the dummy insulation layer 220 is shaved off, the insulation resin 160 may be shaved off entirely.

In each embodiment of the above-described inductor component, the inner magnetic path portion 41, the outer magnetic path portion 42, the first magnetic layer 43, the insulation resin magnetic layer 44, and the second magnetic layer 45 are not integrated but are separate, and boundaries may be present. Although boundaries are present in the drawings, there may be no boundaries in actuality.

In the second embodiment of the above-described inductor component, the structure of the external terminal 180 is not limited the example in the above-described second embodiment. For example, a layer made simply from copper may constitute the external terminal 180.

In the second embodiment of the above-described inductor component, the insulation layer 170 and the external terminal 180 may be omitted. Further, the structures equivalent to the insulation layer 170 and the external terminal 180 according to the second embodiment may be included in the above-described first embodiment.

In each embodiment of the above-described inductor component, the first dummy wiring and the second dummy wiring may be omitted.

In each embodiment of the above-described inductor component, the inductor wiring, the first dummy wiring, the second dummy wiring, the first vertical wiring, and the second vertical wiring are not integrated but are separate, and boundaries may be present. Although boundaries are present in the drawings, there may be no boundaries in actuality.

In each embodiment of the above-described inductor component, the number of units of inductor wiring arranged in an identical layer to the first layer is not limited to the example in each embodiment described above. For example, in the first embodiment, the number of units of inductor wiring 20 arranged in the first layer L1 may be two or more. Further, in the second embodiment, the number of units of inductor wiring 120 arranged in the first layer L11 may be one or be three or more.

In the second embodiment of the above-described inductor component, the minimum distance DI between the two units of inductor wiring 120 may be different from the distance between the first pad 122 and the second pad 123. For example, the distance between the units of wiring body 121 may be the minimum distance between the two units of inductor wiring 120.

In the second embodiment of the above-described inductor component, the relation between the minimum distance DI between the two units of inductor wiring 120 and the mean particle diameter of the magnetic layer 140 is not limited to the example in the above-described second embodiment. Specifically, the minimum distance DI between the two units of inductor wiring 120 is shorter than 20 times the mean particle diameter of the magnetic layer 140.

In the second embodiment of the above-described inductor component, the relation between the minimum distance DI between the two units of inductor wiring 120 and the minimum distance DD between the units of dummy wiring coupled to the two units of inductor wiring 120 is not limited to the example in the above-described second embodiment. Specifically, the minimum distance DD between the units of dummy wiring coupled to the two units of inductor wiring 120 is smaller than or equal to the minimum distance between the two units of inductor wiring 120.

In each embodiment of the above-described inductor component, the inductor component thickness is not limited to the example in each embodiment described above. The inductor component thickness may be approximately 0.300 mm or larger.

In each embodiment of the above-described inductor component, the shape of the inductor component in a top view is not limited to the example in each embodiment described above. For example, in the first embodiment, the inductor component 10 in a top view may approximately be rectangular or circular. In this case, similarly, the shapes of the first layer L1 to the fourth layer L4 in a top view may also be approximately rectangular or circular.

In the embodiment of the above-described manufacturing method, the shape, size, material, and the like of the base member 210 is not limited to the manufacturing method presented above as an example. In particular, the thickness of the base member 210 does not affect the inductor component thickness TA2 after the manufacture and is therefore just desired to be a thickness that facilitates the handling during processing as suitable.

In the embodiment of the above-described manufacturing method, the technique to form the seed layer 230 is not limited to sputtering. For example, the seed layer 230 may be formed using a metal film, a deposition technique, an application technique, or the like.

In the embodiment of the above-described manufacturing method, the materials of the first covering portion 240 and the second covering portion 250 are not particularly limited. For example, organic insulation resin may be formed, such as epoxy-based resin, phenol-based resin, polyimide-based resin, and the like.

In the embodiment of the above-described manufacturing method, the techniques in the first covering step and the second covering step are each not limited to the technique using a dry film resist. For example, a thin film may be used to form the first covering portion 240 and the second covering portion 250.

In the embodiment of the above-described manufacturing method, the technique in the inductor wiring processing step is not limited to the SAP. For example, the inductor wiring processing step may be a fully-additive process or a subtractive process, or be screen printing or an application process of dispensing, ink jet, or the like.

In the embodiment of the above-described manufacturing method, the amount of an upper end portion of the magnetic layer 140 shaved off in the first magnetic layer processing step is just desired to be adjusted as suitable. For example, when the first magnetic layer thickness TM11 or the second magnetic layer thickness TM12 are desired to be set so that it is large, an amount of an upper end portion of the magnetic layer 140 shaved off is just desired to be small.

In the embodiment of the above-described manufacturing method, the amount of a lower end portion of the magnetic layer 140 shaved off in the second magnetic layer processing step is just desired to be adjusted as suitable. For example, when the second magnetic layer thickness TM12 is desired to be set so that it is large, an amount of a lower end portion of the magnetic layer 140 shaved off is just desired to be small.

In the embodiment of the above-described manufacturing method, the inductor component to be manufactured is not limited to the inductor component 110. For example, the above-described manufacturing method is also applicable to the manufacture of the inductor component 10. In this case, external terminal processing step and the insulation layer processing step are omitted.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

inductor wiring of a single layer, the inductor wiring includes copper, and in composition of the inductor wiring, a proportion of sulfur is from 0.1 wt % to less than 1.0 wt %;

a first magnetic layer arranged at a side of a first surface of the inductor wiring;

a second magnetic layer arranged at a side of a second surface of the inductor wiring, the second surface being opposite the first surface; and vertical wiring that penetrates the first magnetic layer and is coupled to the inductor wiring, wherein when a direction orthogonal to a principal surface of the second magnetic layer is referred to as a normal direction, a first magnetic layer thickness of the first magnetic layer as a measurement in the normal direction is smaller than a second magnetic layer thickness of the second magnetic layer as a measurement in the normal direction, and an inductor wiring thickness of the inductor wiring as a measurement in the normal direction is from larger than 0.5 times a vertical wiring thickness of the vertical wiring as a measurement in the normal direction to smaller than 1.5 times the vertical wiring thickness.

2. The inductor component according to claim 1, wherein the inductor wiring includes a pad that is coupled to the vertical wiring and a wiring body that is coupled to the pad, and the inductor wiring thickness is smaller than an inductor wiring width of the wiring body as a measurement in a direction orthogonal to the inductor wiring thickness in a cross section perpendicular to a direction in which the wiring body extends.

3. The inductor component according to claim 1, wherein in composition of the inductor wiring, a proportion of copper is 99 wt % or more.

4. The inductor component according to claim 1, wherein a number of turns of the inductor wiring is less than 1.0.

5. The inductor component according to claim 1, wherein the inductor wiring thickness is from 40 μm to 55 μm.

6. The inductor component according to claim 1, further comprising:

dummy wiring provided in an identical layer to the inductor wiring, wherein the inductor wiring includes a pad that is coupled to the vertical wiring and a wiring body that is coupled to the pad, a first end of the dummy wiring is coupled to the inductor wiring, a second end of the dummy wiring is exposed on an outer surface of the inductor component, a dummy wiring thickness of the dummy wiring as a measurement in the normal direction is equal to the inductor wiring thickness, and a dummy wiring width of the dummy wiring as a measurement in a direction orthogonal to the dummy wiring thickness in a cross section perpendicular to a direction in which the dummy wiring extends is smaller than the inductor wiring width of the wiring body as the measurement in the direction orthogonal to the inductor wiring thickness in the cross section perpendicular to the direction in which the wiring body extends.

7. The inductor component according to claim 1, wherein at least part of an outer surface of the inductor wiring is covered with insulation resin higher in insulation performance than the inductor wiring.

8. The inductor component according to claim 7, wherein the insulation resin covers at least a surface of the inductor wiring on a side of the second magnetic layer in the normal direction.

9. The inductor component according to claim 1, wherein a first surface of the inductor wiring is in contact with the vertical wiring and the first magnetic layer without any other layer interposed therebetween.

10. The inductor component according to claim 1, wherein an external terminal coupled to the vertical wiring on an opposite side of the inductor wiring, and an insulation layer that covers a surface of the first magnetic layer on an opposite side of the second magnetic layer and is higher in insulation performance than the first magnetic layer.

11. The inductor component according to claim 1, wherein the inductor wiring thickness is equal to the vertical wiring thickness.

12. The inductor component according to claim 1, further comprising:

another wiring provided in an identical layer to the inductor wiring.

13. The inductor component according to claim 12, wherein a minimum distance between the inductor wiring and the another inductor wiring is longer than or equal to 20 times a mean particle diameter in the first magnetic layer.

14. The inductor component according to claim 12, further comprising:

dummy wiring and another dummy wiring provided in the identical layer to the inductor wiring and another inductor wiring, wherein a first end of each of the dummy wiring and the another dummy wiring is coupled to each of the inductor wiring and the another dummy wiring respectively, a second end of each of the dummy wiring and the another dummy wiring is exposed on the outer surface of the inductor component, and a minimum distance between the dummy wiring and the another dummy wiring is longer than the minimum distance between the inductor wiring and the another inductor wiring.

15. The inductor component according to claim 1, wherein an inductor component thickness of the inductor component as a measurement in the normal direction is 0.300 mm or smaller.

16. The inductor component according to claim 2, wherein in composition of the inductor wiring, a proportion of copper is 99 wt % or more.

17. The inductor component according to claim 2, wherein a number of turns of the inductor wiring is less than 1.0.

* * * * *